(12) United States Patent
Hampiholi et al.

(10) Patent No.: US 9,381,813 B2
(45) Date of Patent: Jul. 5, 2016

(54) SELECTIVE MESSAGE PRESENTATION BY IN-VEHICLE COMPUTING SYSTEM

(71) Applicant: Harman International Industries, Incorporated, Stamford, CT (US)

(72) Inventors: Vallabha Vasant Hampiholi, Bangalore (IN); Girisha Ganapathy, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 83 days.

(21) Appl. No.: 14/223,077

(22) Filed: Mar. 24, 2014

(65) Prior Publication Data
US 2015/0266377 A1 Sep. 24, 2015

(51) Int. Cl.
| | |
|---|---|
| H04W 4/14 | (2009.01) |
| H04W 4/02 | (2009.01) |
| H04M 1/725 | (2006.01) |
| B60K 35/00 | (2006.01) |
| B60R 16/023 | (2006.01) |
| H04L 12/58 | (2006.01) |
| H04W 4/04 | (2009.01) |

(52) U.S. Cl.
CPC .............. *B60K 35/00* (2013.01); *B60R 16/023* (2013.01); *H04L 51/26* (2013.01); *H04M 1/72552* (2013.01); *H04W 4/046* (2013.01); *H04W 4/14* (2013.01)

(58) Field of Classification Search
USPC ............. 455/412.1, 412.2, 466, 569.2, 575.9, 455/99, 238.1
See application file for complete search history.

(56) References Cited

U.S. PATENT DOCUMENTS

| | | | | |
|---|---|---|---|---|
| 4,839,749 | A * | 6/1989 | Franklin | .......................... 360/12 |
| 2002/0077741 | A1* | 6/2002 | Hanebrink | ............. G01C 21/26 701/117 |
| 2005/0204009 | A1* | 9/2005 | Hazarika et al. | ............... 709/206 |
| 2005/0271037 | A1* | 12/2005 | Habaguchi et al. | ........... 370/351 |
| 2006/0010217 | A1* | 1/2006 | Sood | ........................ H04L 51/12 709/206 |
| 2007/0022172 | A1* | 1/2007 | Anglin | ................... G06Q 10/10 709/207 |
| 2008/0028031 | A1* | 1/2008 | Bailey et al. | ................... 709/207 |
| 2010/0019937 | A1* | 1/2010 | Mori | ......................... G01S 1/70 340/936 |
| 2010/0077054 | A1* | 3/2010 | Harada et al. | ................. 709/207 |
| 2010/0216509 | A1* | 8/2010 | Riemer | ............. H04M 1/72577 455/557 |
| 2011/0187547 | A1* | 8/2011 | Kweon | ........................ 340/670 |

(Continued)

OTHER PUBLICATIONS

Mohn, T., "Tech in Cars: Does Hands-Free Mean Harmless?," BBC Auto Website, Available at http://www.bbc.com/autos/story/20130611-studying-in-car-distraction, Jun. 12, 2013, 6 pages.

(Continued)

*Primary Examiner* — Anthony Addy
*Assistant Examiner* — Ki Ha Nam
(74) *Attorney, Agent, or Firm* — Alleman Hall McCoy Russell & Tuttle LLP

(57) ABSTRACT

Embodiments are disclosed for selectively presenting received messages in a vehicle via an in-vehicle computing system. In some embodiments, a method of selectively presenting the received messages includes extracting information of a received message and determining an operating condition of the vehicle. The method further includes selectively presenting the received message based on the operating condition of the vehicle.

20 Claims, 9 Drawing Sheets

(56) References Cited

U.S. PATENT DOCUMENTS

| | | |
|---|---|---|
| 2011/0221586 A1* | 9/2011 | Eikelenberg et al. .......... 340/439 |
| 2012/0124477 A1* | 5/2012 | Edgar et al. .................... 715/738 |
| 2012/0149405 A1* | 6/2012 | Bhat .............................. 455/466 |
| 2012/0242473 A1* | 9/2012 | Choi .............................. 340/441 |
| 2012/0254417 A1* | 10/2012 | Luna .............................. 709/224 |
| 2012/0329444 A1 | 12/2012 | Osann, Jr. |
| 2013/0038437 A1 | 2/2013 | Talati et al. |
| 2013/0184933 A1 | 7/2013 | Smith et al. |
| 2013/0210406 A1* | 8/2013 | Vidal et al. .................... 455/418 |
| 2013/0346922 A1* | 12/2013 | Shiplacoff .......... G06F 3/04842 715/835 |
| 2014/0046574 A1* | 2/2014 | Eisenbarth et al. ............ 701/105 |
| 2015/0253146 A1* | 9/2015 | Annapureddy ........ G01C 21/36 701/490 |

OTHER PUBLICATIONS

European Patent Office, Extended European Search Report Issued in Application No. 15159768.9, Aug. 4, 2015, Germany, 6 pages.

* cited by examiner

SELECTIVE MESSAGE PRESENTATION BY IN-VEHICLE COMPUTING SYSTEM

FIELD

The disclosure relates to presenting received messages via an in-vehicle computing system.

BACKGROUND

While traveling in a vehicle, a driver may receive messages to various user accounts, such as SMS/text messages, MMS/multimedia messages, email messages, voicemails, etc. Reading and/or responding to such messages may be distracting and/or unsafe while traveling at high speeds, negotiating heavy traffic or difficult intersections, traveling during rough weather, etc. However, by ignoring received messages until a destination is reached, the driver may miss important/urgent information and/or information relevant to the current trip. Waiting until the vehicle stops at a traffic light to check messages may present further issues, as the driver may spend the entire stopped time finding the device to which the messages were sent, launching a relevant application, and/or sorting through the received messages to identify urgent/important messages.

SUMMARY

Embodiments are disclosed for selectively presenting received messages in a vehicle via an in-vehicle computing system. By prioritizing received messages and/or intelligently determining safe/low risk times to present messages to a driver, the driver may stay informed while maintaining safe driving behavior. In some embodiments, a method of selectively presenting the received messages includes extracting information of a received message and determining an operating condition of the vehicle. The method further includes selectively presenting the received message based on the operating condition of the vehicle.

An example in-vehicle computing system for selectively presenting the received messages may include a display, a processor, and a storage device that stores instructions executable by the processor to extract text of received messages, and identify senders and/or receivers of the received messages. The instructions may be further executable to prioritize the received messages based on the extracted text and the identified senders and/or receivers and selectively present the received messages in order of priority based on an operating condition of the vehicle.

Another example in-vehicle computing system for selectively presenting the received messages may include a display, a processor, and a storage device that stores instructions executable by the processor to extract text of a received message and prioritize the received message based on the extracted text. The instructions may further be executable to insert the received message in an ordered list of received messages, a position of the received message in the ordered list being selected based upon the prioritization of the received message, and selectively present a first received message of the ordered list based on an operating condition of vehicle.

BRIEF DESCRIPTION OF THE DRAWINGS

The disclosure may be better understood from reading the following description of non-limiting embodiments, with reference to the attached drawings, wherein below.

DETAILED DESCRIPTION

In-vehicle computing systems may provide a centralized location to receive and view messages while in a vehicle. As described above, selectively presenting such received messages at times during which a driver distraction level and cognitive demand is low (e.g., while the vehicle is stopped or traveling at a steady and slow speed) enables the driver to remain informed about messages received during transit while maintaining safe control over the vehicle. As messages may have varying levels of importance to the driver and windows of opportunity to view/listen to the messages may be short, the messages may also be prioritized to ensure that the highest priority messages are presented to the driver first. By aggregating information from multiple information sources, such as vehicle systems, city infrastructure elements, other vehicles, social networking profiles, etc., to make prioritization and presentation timing decisions, a more complete description of a driver/vehicle environment may be determined relative to systems that utilize fewer information sources or a single information source.

Figure 1:
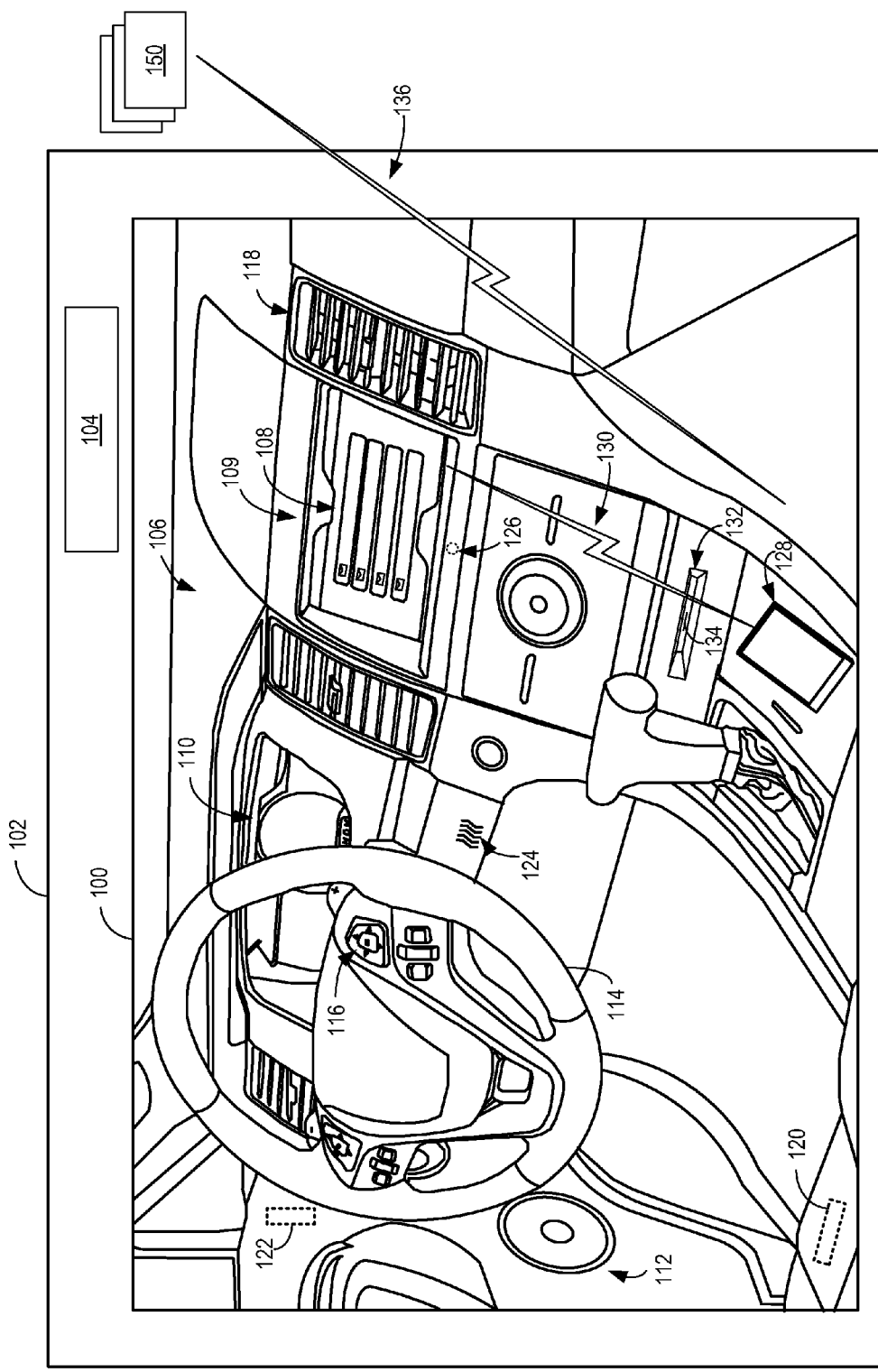
FIG. 1 shows an example partial view of an interior of a cabin of a vehicle in accordance with one or more embodiments of the present disclosure.

FIG. 1 shows an example partial view of one type of environment: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

Instrument cluster 110 may include various gauges such as a fuel gauge, tachometer, speedometer, and odometer, as well as indicators and warning lights. A steering wheel 114 may project from the instrument panel below instrument cluster 110. Optionally, steering wheel 114 may include controls 116 which may be used in conjunction with touch screen 108 to navigate features of an in-vehicle computing system and to control the in-vehicle computing system. In addition to the components depicted in FIG. 1, it will be appreciated that instrument panel 106 may include additional components such as door and window controls, a cigarette lighter which may also be used as a low-voltage power outlet, a glove compartment, and/or any other suitable elements. In one or more embodiments, control of in-vehicle climate (such as cabin temperature) via climate control system vents 118 may be performed using touch screen 108 and thus no separate climate control interface may be included in instrument panel 106. In alternative embodiments, however, a separate climate control interface may be provided.

The cabin 100 may include one or more sensors for monitoring the vehicle, the user, and/or the environment. For example, the cabin 100 may include one or more seat-mounted pressure sensors 120 configured to measure the pressure applied to the seat to determine the presence of a user. The cabin 100 may include one or more door sensors 122 configured to monitor door activity, such as the opening and/or closing of the door, the locking of the door, the operation of a window of the door, and/or any other suitable door activity event. A humidity sensor 124 may be included to measure the humidity content of the cabin. A microphone 126 may be included to receive user input in the form of voice commands, to enable a user to conduct telephone calls, and/or to measure ambient noise in the cabin 100. It is to be understood that the placement of the sensors illustrated in FIG. 1 is exemplary, and one or more additional or alternative sensors may be positioned in any suitable location of the vehicle. For example, additional sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

While the mobile device 128 is illustrated as being spatially separated from the in-vehicle computing system and connected via a substantially external communication link (e.g., a cable or radiofrequency signal), it is to be understood that a slot 132 or other storage structure may be formed in the instrument panel 106 or other location in the vehicle to hold the mobile device in a particular location. The storage structure may include an integrated connector 134 to which the mobile device 128 may be attached or "docked" for providing a substantially internal communication link between the mobile device and the computing system.

In-vehicle computing system 109 may also be communicatively coupled to additional devices operated by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

Figure 2:
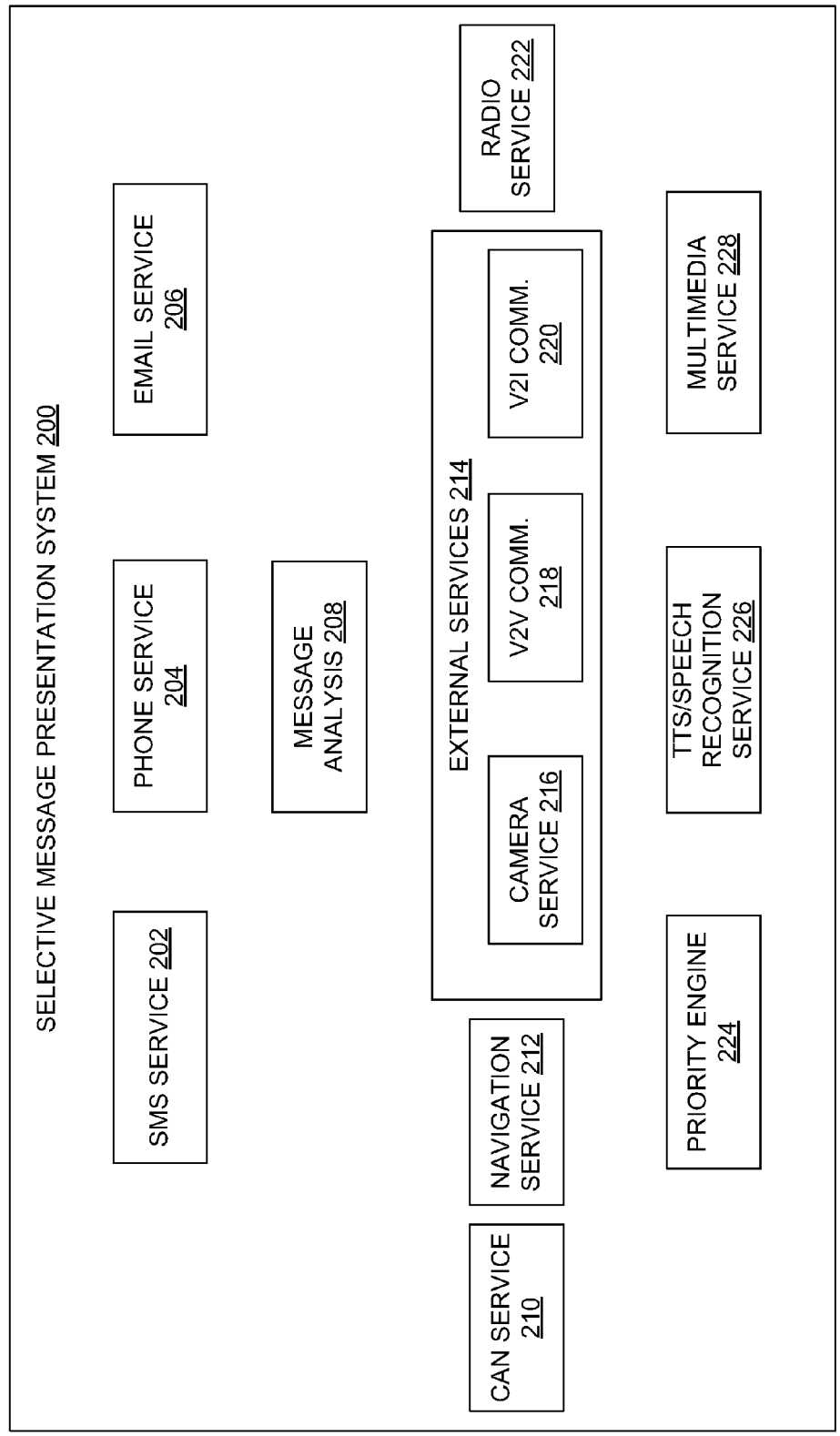
FIG. 2 shows an example block diagram of a selective message presentation system in accordance with one or more embodiments of the present disclosure.

FIG. 2 shows a block diagram of a selective message presentation system 200 for a vehicle, such as vehicle 102 of FIG. 1. As described in more detail below with respect to FIG. 3, one or more of the elements and/or modules of the selective message presentation system 200 may be included in and/or in communication with an in-vehicle computing system of the vehicle, such as in-vehicle computing system 109 of FIG. 1. Elements and/or modules that are in communication with the in-vehicle computing system of the vehicle may be housed in one or more external servers, other vehicles, and/or other devices (e.g., mobile phones, tablets, personal computers, etc.) inside the vehicle and/or external to (e.g., remote from) the vehicle. The modules, services, engines, and other elements described herein may include and/or be formed from instructions stored on non-transitory storage media that are executable to perform one or more of the methods described in the disclosure.

Messages and/or an indication of messages may be received by the selective message presentation system 200 via SMS service 202, phone service 204, and/or email service 206. For example, SMS service 202 may provide message information relating to SMS (e.g., text) and/or MMS (e.g., picture/video/audio) messages sent to a telephone number or other identifier associated with a user (e.g., a driver) of the vehicle. For example, the SMS service may communicate with and/or be included in a mobile phone of a user. In some embodiments, SMS service 202 may be included in the in-vehicle computing system of the vehicle and paired with a mobile phone of the user, such that incoming messages to a telephone number associated with the mobile phone are automatically routed, rerouted, or copied (e.g., a duplicate sent) to SMS service 202. Similarly, voicemails or other phone call information may be routed, rerouted, and/or copied to phone service 204. Email service 206 may receive emails and/or instant messaging information sent to an email address associated with a user of the in-vehicle computing system.

A message analysis module 208, such as a natural language processing (NLP) engine, may extract and/or process extracted text from messages received via the SMS service 202, the phone service 204, and/or the email service 206. In the case of voicemail or other voice-based messages (e.g., as received via phone service 204), received messages may be converted to text (e.g., via speech recognition performed by the in-vehicle computing system and/or an external service) prior to analyzing the message. Extracting text for the messages may include determining message headers (e.g., indicating senders/receivers, sent/received time, message routing information, security information, etc.) and determining a message body (e.g., text representing information specifically provided by the creator of the message for the recipient of the message). The message analysis module 208 may process the message and/or the extracted text of the message to produce a readable summary of a chunk of text and determine which words in the text refer to the same or similar objects. The message analysis module may additionally or alternatively determine which items in the text map to proper names, such as people or places, and determine the type of proper name of each mapped name (e.g., person, location, organization, etc.). The message analysis module 208 may convert chunks of text into more formal representations, such as first-order logic structures that are relatively easier for computer programs to manipulate. For example, the message text may include language that relies upon implicit assumptions that are understandable to a human, yet confounding to a computer program. Accordingly, the message text may be processed to reconcile closed world assumption vs. open world assumption, subjective yes/no vs. objective true/false, or similar sentence constructions to formalize the semantics of the message. The message analysis module 208 may identify relationships between named entities in the text, extract subjective information from a set of messages to determine a sentiment of the message, and/or segment the message into topics and associated portions that are devoted to each topic. The message analysis module 208 may determine that the message is relevant to a particular context by extracting keywords associated with that context (e.g., by determining if the message text includes keywords present in one or more lists of keywords stored on a storage device of the in-vehicle computing system or in communication with the in-vehicle computing system). As the message analysis module 208 may typically operate while a user is in the vehicle, evaluations of misspellings, abbreviations, words with multiple meanings, etc. may be evaluated such that vehicle-related interpretations, interpretations relevant to a current vehicle/user status, and/or interpretation relevant to user information (e.g., calendar items, social networking profiles, address book information, historical data, user preferences, etc.), may be weighed more heavily than other possible interpretations.

For example, a message may be received from a business partner regarding a confirmation of a meeting scheduled for a point in the future. The message analysis module may identify the sender and/or the relationship of the sender to the receiver based on contact information for the sender (e.g., as included in a message header), language used in the message (e.g., a salutation including the receivers first/last name and/or a formal/semi-formal writing style may suggest a professional relationship), and/or other information from the message text. The message analysis module may determine that the message relates to a meeting by detecting the word "meet" and/or detecting a day/time (e.g., a day of the week, a date, and/or other words/phrases associated with meetings, schedules, or dates) included in the message text.

When deciding whether to present received messages, the selective message presentation system 200 may determine an operating condition and/or state of the vehicle. For example, the operating condition and/or state of the vehicle may indicate whether the presentation of a message will provide a dangerous distraction to a driver. For example, if the driving conditions (e.g., the operating condition and/or state of the vehicle) indicate that the driver has a high cognitive load (e.g., is driving at a high speed, on a dangerous/complicated route, in rough weather/road/traffic conditions, etc.), message presentation may be delayed. Conversely, if the driving conditions indicate that the driver has a low cognitive load (e.g., is driving at a slow/constant speed, is stopped, etc.), messages may be presented to the driver.

Indications of the vehicle operating conditions/status may be provided by information from a module or a combination of modules of the selective message presentation system 200. For example, CAN service 210 may include and/or communicate with a controller area network (CAN) bus of a vehicle, through which engine or other vehicle system related information may be communicated. CAN service 210 may determine a vehicle speed, a time of day, an engine status, and/or other information to indicate an operating condition of the vehicle. Navigation service 212 and external services 214 may provide additional information to indicate an operating condition of the vehicle. For example, navigation service 212 may include and/or receive information from a navigation subsystem of an in-vehicle computing system of the vehicle and/or from a navigation subsystem of another device in the vehicle to determine location information for the vehicle, destination information (e.g., a final/ultimate destination and/or planned stops along a route to a final/ultimate destination), routing information (e.g., planned routes, alternative routes, locations along the routes, traffic along the routes, etc.), and other navigation information.

External services 214 may include a camera service 216, a vehicle-to-vehicle communication module 218, and a vehicle-to-infrastructure communication module 220. Camera service 216 may include and/or communicate with one or more cameras located in/on the vehicle (e.g., front-facing/rear-facing cameras on the vehicle) and/or external to the vehicle (e.g., cameras in other vehicles, traffic cameras, security cameras, etc.). Vehicle-to-vehicle communication module 218 may receive information from other vehicles/in-vehicle computing systems in other vehicles via a wireless communication link (e.g., BLUETOOTH, WIFI/WIFI-direct, near-field communication, etc.). Vehicle-to-infrastructure communication module 220 may receive information from infrastructure present along the route of the vehicle, such as traffic signal information (e.g., indications of when a traffic light is expected to change and/or a light changing schedule for a traffic light near the location of the vehicle). Information exchanged with external services 214 may be encrypted or otherwise adjusted to ensure adherence to a selected security level. In some embodiments, information may only be exchanged after performing an authentication process and/or after receiving permission from the sending and/or received entity.

Radio service 222 may provide access to AM/FM radio stations and/or traffic/weather information provided by such radio stations. Radio service 222 may also provide information indicating emergency conditions (e.g., by detecting emergency alerts broadcast by AM/FM radio stations), such as tornado, hurricane, flood, winter storm, wind, tsunami, and/or other weather alerts/warnings, criminal activity warnings, etc. Vehicle operating conditions may be determined based on the information from radio service 222. For example, emergency weather alerts may indicate that the vehicle is operating in or near rough weather.

In addition to indicating whether received messages are to be presented, operating conditions may be utilized in other processes performed by the selective presentation system 200. In some embodiments, the message analysis module 208 may analyze messages and interpret semantics in the message in light of operating conditions. For example, a message may include a reference to a location called "Henry's." As "Henry's" may refer to a restaurant with that name or a house belonging to a contact in the user's address book, the message analysis module 208 may utilize operating conditions of the vehicle to determine which "Henry's" is being referenced. For example, the vehicle may be located near the restaurant "Henry's" and/or travelling to Henry's as a destination, and the message analysis module 208 may interpret the text "Henry's" as referring to the restaurant. The operating conditions to determine a priority of a given message in light of a present or predicted future operating condition. In some embodiments, the operating conditions may be utilized in combination with the content of the messages as determined by the message analysis module 208 to determine the level of urgency or importance of the message. Priority engine 224 may receive information from one or more of the above-described modules to determine a priority of a given message based upon the content of the message and/or the operating condition of the vehicle. For example, the priority engine 224 may assign a numerical value to the message (e.g., on a scale, such as a scale from 1 to 5 in one non-limiting example) indicating a relative priority of the message. The priority assignment may be based on any suitable weighting factors applied to the message content/information and/or the operating condition. For example, priority may be based on whether the message content/information (e.g., message text, sender, receiver, etc.) relates to a recently received phone call or other communication (e.g., other message), is from a preferred contact or other member in the user's address book, relates to a calendar item of the user, relates to an item present in a social networking profile for the user/a friend of the user, etc., as based upon an evaluation of the message via the message analysis module 208 (e.g., in view of other information sources, such as social networking profiles, user preferences, etc.).

The prioritization factors of the message text may be weighed differently based upon a context of the user. In some embodiments, the context of the user may be determined based upon an operating status of the vehicle. For example, if the user is near a first friend's house, messages from the first friend may be prioritized over (e.g., weighed more heavily than) messages from other friends. In this way, the priority engine 224 may aggregate data from multiple information sources to determine the priority of the message. Additionally or alternatively, messages including keywords corresponding to routing information or vehicle-specific keywords may be prioritized higher than received messages that do not include keywords corresponding to the routing information or vehicle-specific keywords.

Upon determining the priority of the message, the priority engine 224 may insert the message into an ordered list comprising zero or more received messages (or instruct a storage device to add the message to a storage location allocated for an ordered list). In this way, the ordered list may include each received message that has not been presented (e.g., messages that were received since a start-up of the vehicle/in-vehicle computing system or other point in time and not presented, all messages for the user/driver that are unread/have not been presented, and/or messages that have been designated as unread by a user). The messages in the ordered list may be arranged in order of priority, such that a highest priority message is at the "top" of the list (e.g., is the first message to be presented upon determining that messages may be presented based on operating conditions of the vehicle or other factors). As explained herein, in one embodiment the system may receive messages in a first order, and then the priority engine may receive that first order and then re-order the messages into a second, different order (and again when new messages are received and/or conditions change, the engine may again re-order the messages, and so on).

As described above, the priority engine 224 may assign a numerical value (e.g., a priority index value) to each received message. As the numerical value may be on a scale of possible values, some messages may be assigned the same numerical values. In such cases, the messages may be ordered by a next hierarchy or level of granularity. For example, messages having the same priority may be ordered amongst one another by time/date of receipt, by sender/receiver, by length, by message content, and/or by any other suitable metric. In some embodiments, a secondary weighting may be applied to determine priority between messages having a same priority value. For example, the priority engine 224 may assign a first and a second message a priority value of 4 responsive to determining that both messages include at least one keyword corresponding to a calendar item. However, while the first message may include at least one keyword corresponding to a first calendar item occurring at 4 pm on a Friday, the second message may include at least one keyword corresponding to a second calendar item occurring at 1 pm that same Friday. Accordingly, the presence of the keyword in the second message may be weighed more heavily than the presence of the keyword in the first message, due to the relatively higher level of urgency of the second calendar item. In such an example, the second message may be positioned higher on the ordered list than the first message, and subsequently presented to the user before the first message.

Responsive to determining that a message is to be presented to a user in the vehicle (e.g., based upon an operating condition of the vehicle), the message in the ordered list having the highest priority level (e.g., the first message in the list) may be sent to a text-to-speech/speech recognition service 226 to convert the message to a form that may be presented to the user. For example, if the message is an audio message (e.g., a voicemail) to be presented to the user visually (e.g., via a display of the in-vehicle computing device), the text-to-speech/speech recognition service 226 may perform speech recognition to convert the message into text that may be displayed on the display device. If the message is an email/text message (or a voicemail message that has been converted to into text by the message analysis module 208) that is to be presented audibly via speakers of the vehicle, the text-to-speech/speech recognition service 226 may convert the email/text message into speech data representing the message and output the speech data via the speakers. The message may be parsed by the text-to-speech/speech recognition service 226 or prior to being sent to the text-to-speech/speech recognition service 226 in order to present a subset of the message information to the user. For example, only the message body may be presented to the user in some embodiments. In other embodiments, some message information (e.g., sender, receiver, time sent/received, etc.) may be presented in addition to the message body. In still other embodiments, only a portion of the message body may be presented to the user, along with or without message information. It is to be understood that messages that are already in the correct format for a given presentation mode may bypass the text-to-speech/speech recognition service 226 without being converted.

Multimedia service 228 may provide message playback services, and include and/or be in communication with one or more of a display of the in-vehicle computing system, speakers of the vehicle, and speakers/displays of other devices (e.g., a smart phone or other computing device located within the vehicle). Upon converting the message into the correct format (or determining that the message is already in the correct format), the converted message (e.g., the extracted/parsed message text and/or speech data) may be sent to the multimedia service 228 for presentation via one or more output devices. The multimedia service 228 may perform additional processing on the converted message to prepare the message for transmission and/or to ensure that the message is able to be played back via the selected output device(s). The output device(s) to which the converted/processed message is sent may be selected via user input (e.g., for each message and/or for a group of messages), selected based on user preferences (e.g., stored on a storage device), and/or predetermined (e.g., a default output device may be used for all messages, or default output devices may be defined for types of messages, operating conditions/status, etc.). The multimedia service 228 may be communicatively connected to one or more output devices (e.g., a display device of the in-vehicle computing system, speakers of the vehicle, a display/speakers of a device in the vehicle, etc.) and may send the converted/processed message to the selected output device(s).

Figure 3:
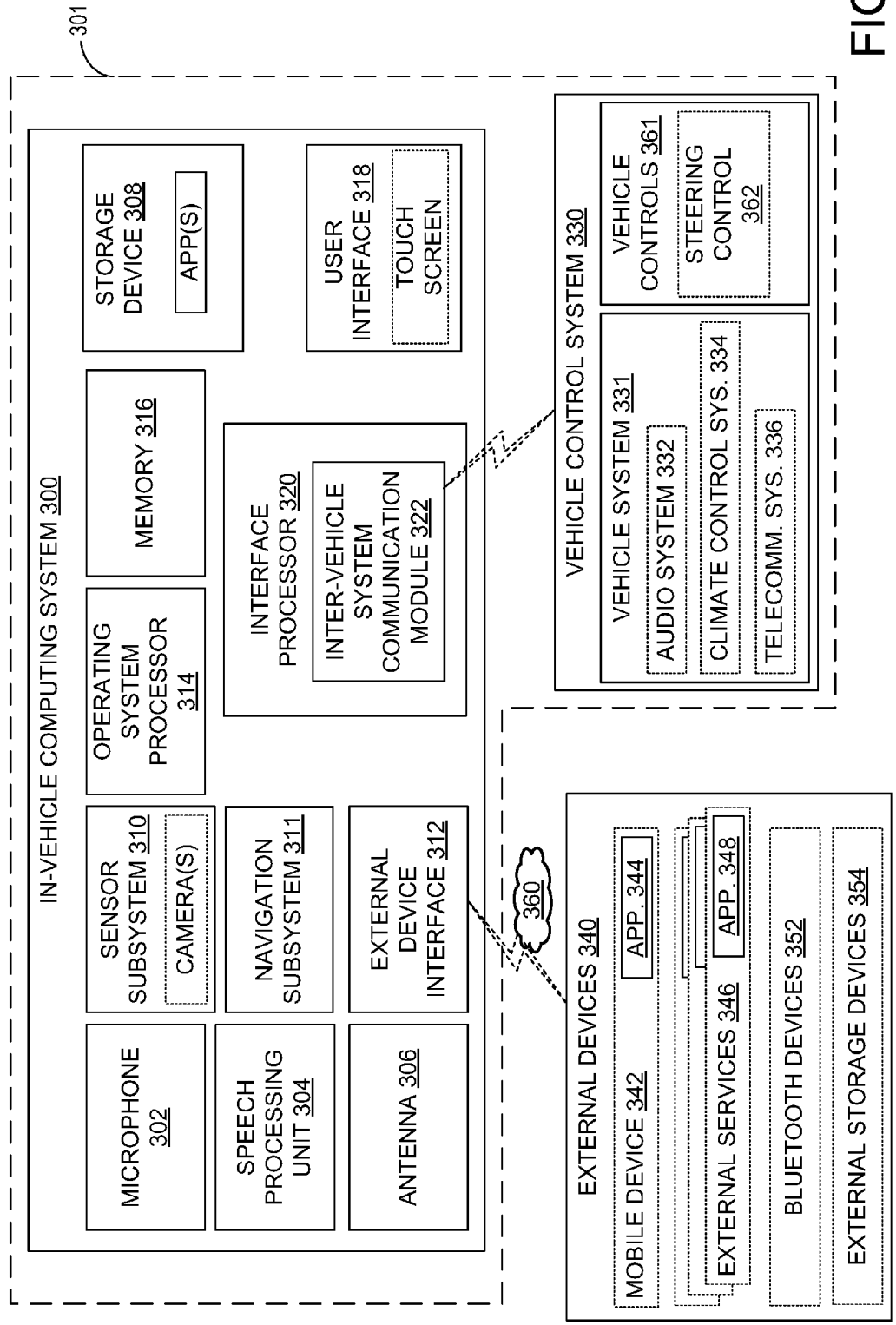
FIG. 3 shows a block diagram of an in-vehicle computing system in accordance with one or more embodiments of the present disclosure.

FIG. 3 shows a block diagram of an in-vehicle computing system 300 configured and/or integrated inside vehicle 301. In-vehicle computing system 300 may be an example of in-vehicle computing system 109 of FIG. 1 and/or include one or more modules/elements of the selective message presentation system of 200 of FIG. 2 in some embodiments. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 301 in order to enhance an in-vehicle experience for a driver and/or a passenger.

In-vehicle computing system 300 may include one or more processors including an operating system processor 314 and an interface processor 320. Operating system processor 314 may execute an operating system on the in-vehicle computing system, and control input/output, display, playback, and other operations of the in-vehicle computing system. Interface processor 320 may interface with a vehicle control system 330 via an inter-vehicle system communication module 322.

Inter-vehicle system communication module 322 may output data to other vehicle systems 331 and vehicle control elements 361, while also receiving data input from other vehicle components and systems 331, 361, e.g. by way of vehicle control system 330. When outputting data, inter-vehicle system communication module 322 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 308 may be included in in-vehicle computing system 300 to store data such as instructions executable by processors 314 and 320 in non-volatile form. The storage device 308 may store application data to enable the in-vehicle computing system 300 to run an application for connecting to a cloud-based server and/or collecting information for transmission to the cloud-based server. The application may retrieve information gathered by vehicle systems/sensors, input devices (e.g., user interface 318), devices in communication with the in-vehicle computing system (e.g., a mobile device connected via a Bluetooth link), etc. In-vehicle computing system 300 may further include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 320), controls the in-vehicle computing system 300 to perform one or more of the actions described in the disclosure.

A microphone 302 may be included in the in-vehicle computing system 300 to receive voice commands from a user, to measure ambient noise in the vehicle, to determine whether audio from speakers of the vehicle is tuned in accordance with an acoustic environment of the vehicle, etc. A speech processing unit 304 may process voice commands, such as the voice commands received from the microphone 302. In some embodiments, in-vehicle computing system 300 may also be able to receive voice commands and sample ambient vehicle noise using a microphone included in an audio system 332 of the vehicle.

One or more additional sensors may be included in a sensor subsystem 310 of the in-vehicle computing system 300. For example, the sensor subsystem 310 may include a camera, such as a rear view camera for assisting a user in parking the vehicle and/or a cabin camera for identifying a user (e.g., using facial recognition and/or user gestures). Sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 310 alone, other sensors may communicate with both sensor subsystem 310 and vehicle control system 330, or may communicate with sensor subsystem 310 indirectly via vehicle control system 330. A navigation subsystem 311 of in-vehicle computing system 300 may generate and/or receive navigation information such as location information (e.g., via a GPS sensor and/or other sensors from sensor subsystem 310), route guidance, traffic information, point-of-interest (POI) identification, and/or provide other navigational services for the driver.

External device interface 312 of in-vehicle computing system 300 may be coupleable to and/or communicate with one or more external devices 340 located external to vehicle 301. While the external devices are illustrated as being located external to vehicle 301, it is to be understood that they may be temporarily housed in vehicle 301, such as when the user is operating the external devices while operating vehicle 301. In other words, the external devices 340 are not integral to vehicle 301. The external devices 340 may include a mobile device 342 (e.g., connected via a Bluetooth connection) or an alternate Bluetooth-enabled device 352. Mobile device 342 may be a mobile phone, smart phone, wearable devices/sensors that may communicate with the in-vehicle computing system via wired and/or wireless communication, or other portable electronic device(s). Other external devices include external services 346. For example, the external devices may include extra-vehicular devices that are separate from and located externally to the vehicle. Still other external devices include external storage devices 354, such as solid-state drives, pen drives, USB drives, etc. External devices 340 may communicate with in-vehicle computing system 300 either wirelessly or via connectors without departing from the scope of this disclosure. For example, external devices 340 may communicate with in-vehicle computing system 300 through the external device interface 312 over network 360, a universal serial bus (USB) connection, a direct wired connection, a direct wireless connection, and/or other communication link. The external device interface 312 may provide a communication interface to enable the in-vehicle computing system to communicate with mobile devices associated with contacts of the driver. For example, the external device interface 312 may enable phone calls to be established and/or text messages (e.g., SMS, MMS, etc.) to be sent (e.g., via a cellular communications network) to a mobile device associated with a contact of the driver (e.g., via SMS service 202, phone service 204, and/or email service 206 of FIG. 2).

One or more applications 344 may be operable on mobile device 342. As an example, mobile device application 344 may be operated to aggregate user data regarding interactions of the user with the mobile device. For example, mobile device application 344 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by application 344 to external device interface 312 over network 360. In addition, specific user data requests may be received at mobile device 342 from in-vehicle computing system 300 via the external device interface 312. The specific data requests may include requests for determining where the user is geographically located, an ambient noise level and/or music genre at the user's location, an ambient weather condition (temperature, humidity, etc.) at the user's location, etc. Mobile device application 344 may send control instructions to components (e.g., microphone, etc.) or other applications (e.g., navigational applications) of mobile device 342 to enable the requested data to be collected on the mobile device. Mobile device application 344 may then relay the collected information back to in-vehicle computing system 300.

Likewise, one or more applications 348 may be operable on external services 346. As an example, external services applications 348 may be operated to aggregate and/or analyze data from multiple data sources. For example, external services applications 348 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 330 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

Audio system 332 may include one or more acoustic reproduction devices including electromagnetic transducers such as speakers. Vehicle audio system 332 may be passive or active such as by including a power amplifier. In some examples, in-vehicle computing system 300 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 334 may be configured to provide a comfortable environment within the cabin or passenger compartment of vehicle 301. Climate control system 334 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 330 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. The control signals may also control audio output at one or more speakers of the vehicle's audio system 332. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 334. For example, the control signals may increase delivery of cooled air to a specific section of the cabin.

Control elements positioned on an outside of a vehicle (e.g., controls for a security system) may also be connected to computing system 300, such as via communication module 322. The control elements of the vehicle control system may be physically and permanently positioned on and/or in the vehicle for receiving user input. In addition to receiving control instructions from in-vehicle computing system 300, vehicle control system 330 may also receive input from one or more external devices 340 operated by the user, such as from mobile device 342. This allows aspects of vehicle systems 331 and vehicle controls 361 to be controlled based on user input received from the external devices 340.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna(s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 300 and mobile device 342 via user interface 318. In addition to receiving a user's vehicle setting preferences on user interface 318, vehicle settings selected by in-vehicle control system may be displayed to a user on user interface 318. Notifications and other messages (e.g., received messages), as well as navigational assistance, may be displayed to the user on a display of the user interface. User preferences/information and/or responses to presented messages may be performed via user input to the user interface.

Figure 4:
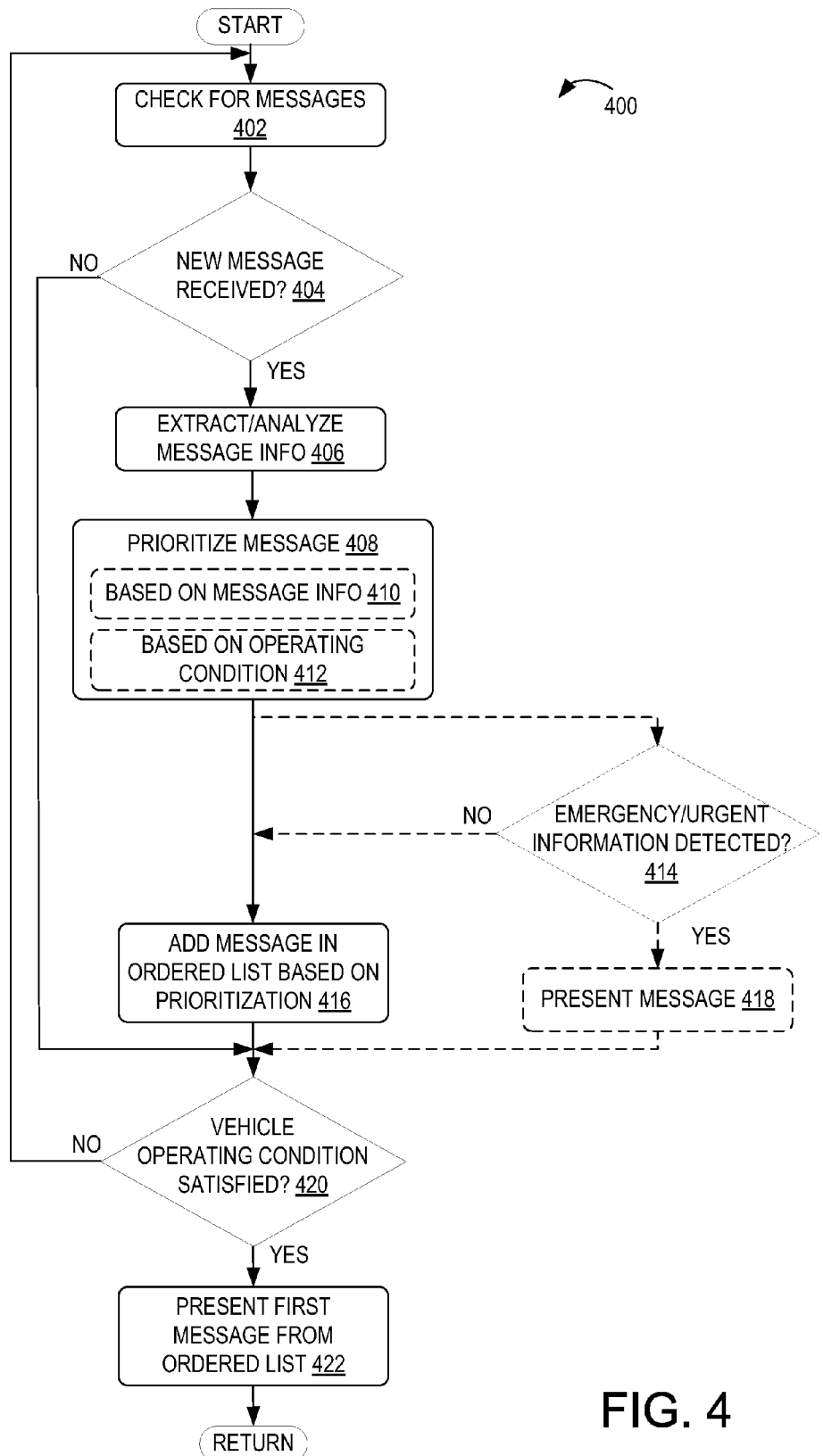
FIG. 4 shows a flow chart of a method for selectively presenting messages in a vehicle in accordance with one or more embodiments of the present disclosure.

FIG. 4 is a flow chart of a method 400 for selectively presenting messages in a vehicle. Method 400 may be performed by a selective message presentation system (e.g., system 200 of FIG. 2), and/or an in-vehicle computing system (e.g., in-vehicle computing system 109 of FIG. 1). At 402, the method 400 includes checking for messages. In some embodiments, new messages may trigger an interrupt or similar function, such that new messages may be detected at any point in time. In such embodiments, checking for messages may be understood to include receiving an interrupt or other indication of a new message. If a new message has been received at 404 (e.g., "YES" at 404), the method 400 proceeds to 406 to extract and/or analyze message information within the received message. For example, a message analyzer, such as message analysis module 208 of FIG. 2 may extract and analyze text (e.g., human-readable text), metadata, voice data (e.g., speech data from a voicemail message), and/or other information from the new message received at 404. The method 400 may include prioritizing the message (e.g., relative to other received messages) at 408. For example, the prioritization of the message may be based upon the message information, as indicated at 410, and/or operating conditions of the vehicle or other information relating to the user or a state of the user, as indicated at 412. An example method of determining prioritization of the message is described in more detail below with respect to FIG. 9.

Method 400 may include determining if emergency and/or urgent information is detected, as indicated at 414. For example, such information may be detected responsive to determining that the received message includes keywords such as "emergency," "urgent," "danger," "hurry," and/or any other suitable word(s) indicating a potential emergency condition. If an emergency condition is not detected (e.g., "NO" at 414), the method 400 proceeds to 416 to add the received message into an ordered list at a location of the ordered list based on the prioritization determined at 408. Conversely, if an emergency condition is detected (e.g., "YES" at 414), the method may proceed to 418 to present the message substantially immediately. In other words, even if other messages are present in the ordered list, a message that is identified as urgent or an emergency message may be presented upon receipt, regardless of an operating condition of the vehicle.

Once the message has been added to the ordered list, upon determining that no new message is received ("NO" at 404), or after presenting a message designated as meeting an emergency condition at 414, the method 400 proceeds to 420 to determine whether a vehicle operating condition is satisfied. It is to be understood that determining whether a vehicle operating condition is satisfied and/or determining operating conditions of the vehicle may be performed prior to prioritizing the message and/or adding the message to an ordered list in some embodiments. Examples of determining whether vehicle operating conditions are satisfied are described in more detail below with respect to FIGS. 5-7. If the vehicle operating condition is not satisfied (e.g., "NO" at 420), the method 400 returns to 402 to check for new messages without presenting any of the messages from the ordered list. In other words, responsive to determining that the vehicle operating condition is not satisfied, the received message and/or received messages in the ordered list may not by presented. In embodiments in which vehicle conditions are evaluated prior to prioritizing and/or adding a message to the ordered list, in response to determining that a vehicle operating condition is not satisfied, the prioritization and message insertion may be performed, followed by an immediate return to check for new messages.

Responsive to determining that the vehicle operating condition is satisfied (e.g., "YES") at 420, the method 400 proceeds to 422 to present a first message from the ordered list. For example, the newest (e.g., most recently received) message may be different from the first message from the ordered list if the newest message was assigned a lower priority value than one or more previously received messages in the ordered list. Presenting the first message from the ordered list at 422 may include presenting the message visually (e.g., via a display of the in-vehicle computing system and/or another device) and/or presenting the message audibly (e.g., via speakers of the vehicle and/or another device). Although the method 400 is illustrated as returning to check for messages after presenting the first message from the ordered list, it is to be understood that multiple messages may be presented before returning to check for messages in some embodiments. For example, the number of messages presented at 422 may depend upon an operating condition of the vehicle (e.g., how long the vehicle is or is predicted to be stopped or otherwise in a state that enables a user to safely receive messages) in some embodiments, while in other embodiments a predetermined threshold number of messages (e.g., an integer number or a percentage of unread messages) may be presented before returning to 402 to check for new messages. The number of messages presented may additionally or alternatively depend upon the content of the messages. For example, all messages of a particular priority or range of priorities may be presented at 422. In other embodiments, messages from the ordered list may be continually presented in order of priority until the vehicle operating condition is no longer satisfied (or is not satisfied for a threshold period of time).

While the method 400 includes selectively presenting received messages to a driver of a vehicle, it is to be understood that some messages may remain in the ordered list upon reaching a destination. Accordingly, upon reaching a destination or detecting an engine idle, shut-down, or other condition indicative of an intent to leave the vehicle, the in-vehicle computing system may notify the driver of the remaining unread/unheard messages and prompt the user to select whether to play back all, some, or none of the messages at that time (e.g., in order of priority). In some embodiments, the driver may schedule a later playback time, or the messages may remain in the ordered list and maintained until presented, even if the remaining messages are not presented until a later trip.

Figure 5:
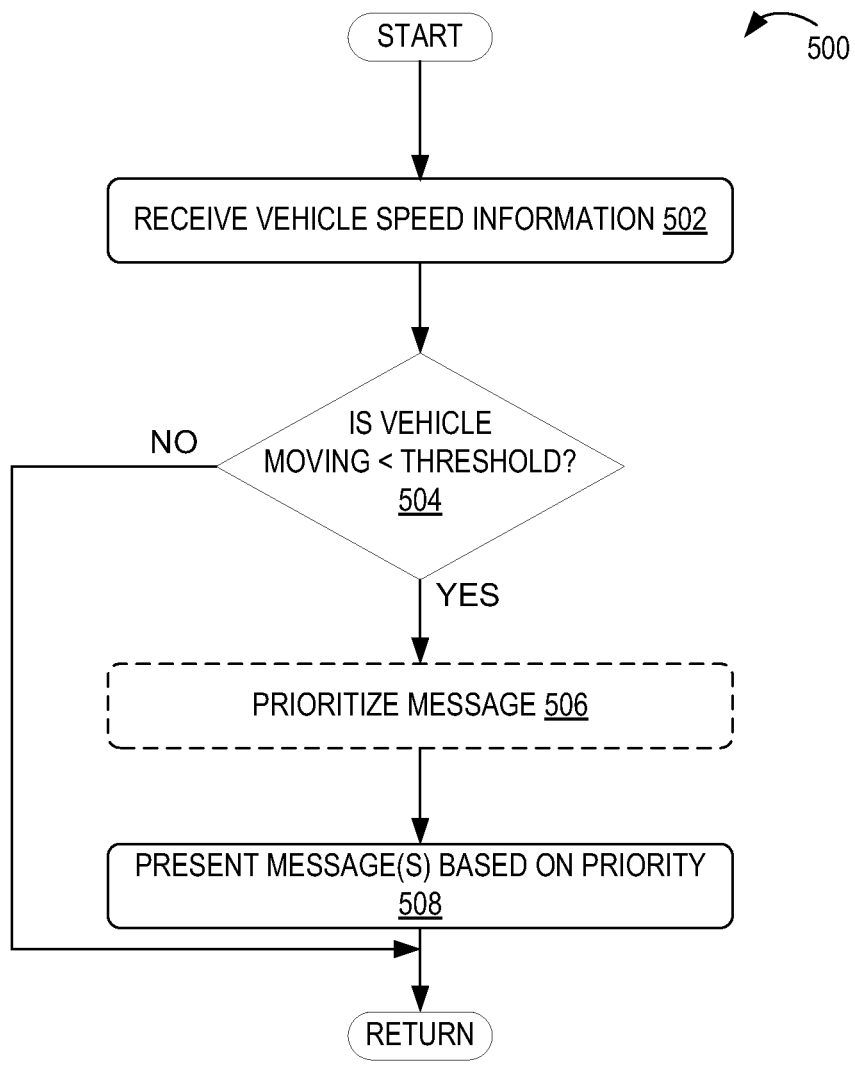
FIGS. 5-7 show flow charts of methods for determining whether a vehicle condition for selectively presenting messages is met in accordance with one or more embodiments of the present disclosure.

Turning now to FIG. 5, a flow chart of an example method 500 for determining whether a vehicle operating condition is shown. For example, method 500 or a portion of method 500 may be performed at 420 of FIG. 4 to determine whether the vehicle operating condition is met based on information received from one or more vehicle systems (e.g., via a CAN bus). In some embodiments, the method may be performed by a selective message presentation system (e.g., system 200 of FIG. 2), and/or an in-vehicle computing system (e.g., in-vehicle computing system 109 of FIG. 1). At 502, method 500 includes receiving vehicle speed information. The vehicle speed information may be received from one or more vehicle systems communicatively connected to the in-vehicle computing system via the CAN bus. At 504, the method includes determining whether the vehicle is moving below a speed threshold. In some examples, the speed threshold may be static and/or predetermined. For example, the speed threshold may equal 5 miles per hour (mph). In other examples, the speed threshold may be dynamic and/or determined based upon operating conditions of the vehicle. For example, the speed threshold may be decreased under certain weather conditions, traffic conditions, or other conditions that may increase a cognitive load on a driver. The speed threshold may be increased in some embodiments responsive to determining that the vehicle has been traveling, is traveling, and/or is predicted to be traveling at a constant speed for a threshold period of time. For example, the speed threshold may initially be set to 5 mph, however, upon determining that the vehicle is predicted to maintain a speed of 10 mph for a threshold period of time/distance, the speed threshold may be set to 10 mph.

Responsive to determining that the vehicle is moving at a speed that is greater than or equal to the speed threshold (e.g., "NO" at 504), the method 500 returns to 502 continue receiving vehicle speed information (or returns to a main routine, in examples in which method 500 or a portion of method 500 is utilized as a subroutine, such as a subroutine of 420 illustrated in FIG. 4). If the vehicle is determined to be moving at a speed that is greater than or equal to the threshold, the vehicle operating condition (e.g., the vehicle operating condition evaluated at 420 of FIG. 4) or a speed factor of a vehicle operating condition may be determined to not be satisfied.

Responsive to determining that the vehicle is moving at a speed that is less than the speed threshold (e.g., "YES" at 504), the method 500 may continue to 506 to prioritize the message. If the vehicle is determined to be moving at a speed that is less than the speed threshold, the vehicle operating condition (e.g., the vehicle operating condition evaluated at 420 of FIG. 4) or a speed factor of a vehicle operating condition may be determined to be satisfied. The method 500 may then present one or more messages (e.g. from an ordered list) based on priority, as indicated at 508.

Figure 6:
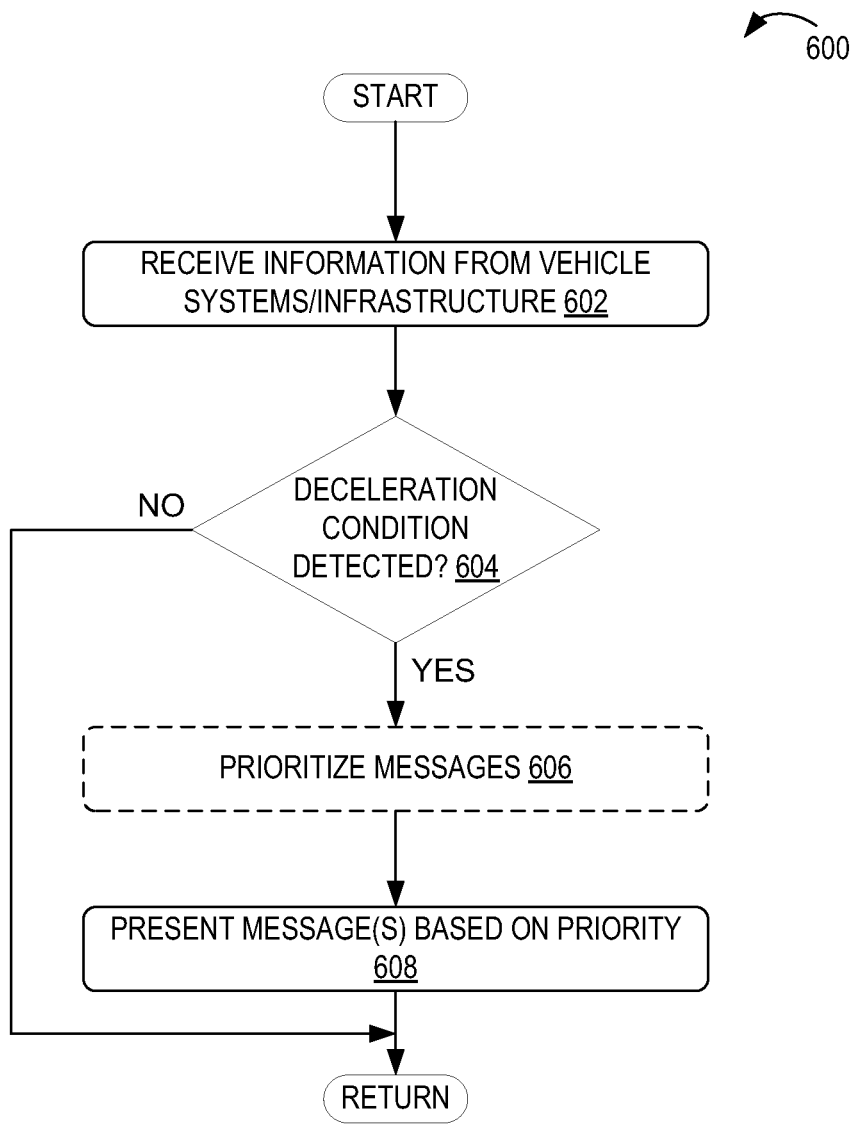

Turning now to FIG. 6, a flow chart of an example method 600 for determining whether a vehicle operating condition is shown. For example, method 600 or a portion of method 600 may be performed at 420 of FIG. 4 to determine whether the vehicle operating condition is met based on information received from one or more vehicle systems (e.g., via a CAN bus) and/or infrastructure elements. In some embodiments, the method may be performed by a selective message presentation system (e.g., system 200 of FIG. 2), and/or an in-vehicle computing system (e.g., in-vehicle computing system 109 of FIG. 1). At 602, method 600 includes receiving information from vehicle systems and/or infrastructure elements of a region. The information may be received from one or more vehicle systems communicatively connected to the in-vehicle computing system via the CAN bus and/or from one or more infrastructure elements (e.g., traffic signal systems, road sensors, speed/security cameras, bridge/public transit information systems, etc.) received via one or more wireless communication links. At 604, the method includes determining whether a deceleration condition is detected. In some examples, the deceleration condition may include a measured deceleration that meets a deceleration threshold or a measured deceleration that reduces the vehicle speed to a speed that is below a speed threshold. In additional or alternative examples, the deceleration condition may correspond to a predicted amount of deceleration that meets the deceleration threshold. For example, based upon information from nearby traffic signal systems, a deceleration condition may be detected responsive to determining that the vehicle is predicted to be stopped at a traffic light for a threshold period of time. In another example, based upon information from a bridge information system, the deceleration condition may be detected responsive to determining that a bridge along a route of the vehicle and within a threshold distance of the vehicle is lifted resulting in a deceleration of the vehicle to a stop. A predicted vehicle speed or deceleration may be thus be based upon traffic signal information, real-time traffic status, historical data, and/or information from one or more other vehicles. A deceleration condition may not be detected if the information from the vehicle systems and/or infrastructure elements does not indicate that the vehicle is or will be decelerating a threshold amount (or decelerating to a speed that is below a speed threshold).

Responsive to determining that the deceleration condition is not detected (e.g., "NO" at 604), the method 600 returns to 602 continue receiving information (or returns to a main routine, in examples in which method 600 or a portion of method 600 is utilized as a subroutine, such as a subroutine of 420 illustrated in FIG. 4). If the deceleration condition is not detected, the vehicle operating condition (e.g., the vehicle operating condition evaluated at 420 of FIG. 4) or a deceleration factor of a vehicle operating condition may be determined to not be satisfied.

Responsive to determining that the deceleration condition is detected (e.g., "YES" at 604), the method 600 may continue to 606 to prioritize the message. If the deceleration condition is detected, the vehicle operating condition (e.g., the vehicle operating condition evaluated at 420 of FIG. 4) or a deceleration factor of a vehicle operating condition may be determined to be satisfied. The method 600 may then present one or more messages (e.g. from an ordered list) based on priority, as indicated at 608.

Figure 7:
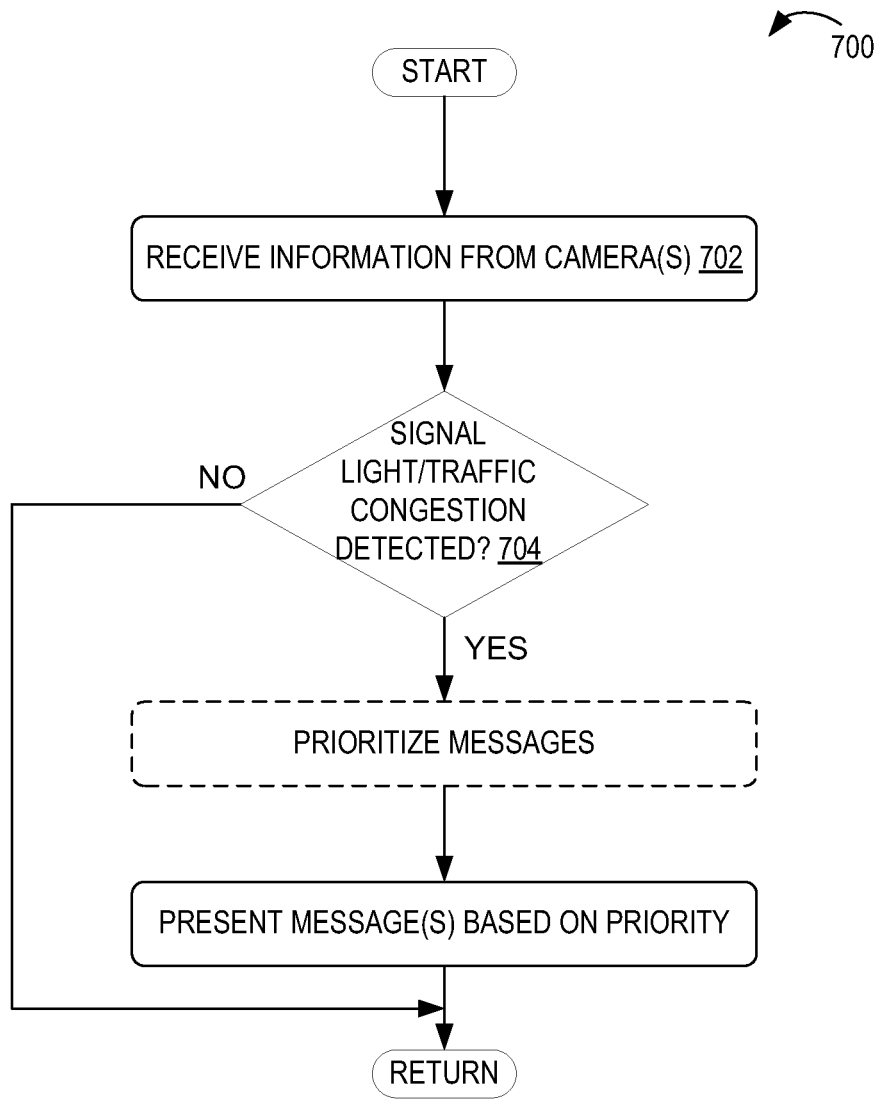

Turning now to FIG. 7, a flow chart of an example method 700 for determining whether a vehicle operating condition is shown. For example, method 700 or a portion of method 700 may be performed at 420 of FIG. 4 to determine whether the vehicle operating condition is met based on information received from one or more cameras. In some embodiments, the method 700 may be performed by a selective message presentation system (e.g., system 200 of FIG. 2), and/or an in-vehicle computing system (e.g., in-vehicle computing system 109 of FIG. 1). At 702, method 700 includes receiving information from one or more cameras. The information may include image data from one or more cameras located in/on the vehicle and/or remotely from/externally to the vehicle and received via one or more wired or wireless communication links. At 704, the method includes determining whether a particular signal light or traffic congestion condition is detected. A signal light and/or traffic congestion condition may include a condition in which a traffic signal light is or is changing to an indication that the vehicle will be slowing or coming to a stop and/or a condition in which a traffic congestion level is high enough (e.g., above a congestion threshold) to indicate that the vehicle will be slowing or coming to a stop. For example, a forward-facing camera mounted on a vehicle may indicate that a traffic signal light in front of the vehicle has just changed to red, meaning that the vehicle will be stopped at the traffic signal. In such an example, the signal light condition may be detected. Likewise, the traffic congestion condition may be detected responsive to image data from a forward/rear-facing camera on the vehicle and/or traffic cameras mounted along the road/on nearby buildings that indicate the presence of slow-moving traffic (e.g., traffic moving at a speed or an average speed that is below a threshold) within a threshold distance of the vehicle. Conversely, the signal light/traffic congestion condition may not be detected if image data from one or more cameras indicates that a light is green (indicating that the vehicle is permitted to move through the light without stopping) and/or that a level of traffic congestion around the vehicle is below a congestion threshold.

Responsive to determining that the signal light/traffic congestion condition is not detected (e.g., "NO" at 704), the method 700 returns to 702 continue receiving information (or returns to a main routine, in examples in which method 700 or a portion of method 700 is utilized as a subroutine, such as a subroutine of 420 illustrated in FIG. 4). If the signal light/traffic congestion condition is not detected, the vehicle operating condition (e.g., the vehicle operating condition evaluated at 420 of FIG. 4) or a traffic signal/congestion factor of a vehicle operating condition may be determined to not be satisfied.

Responsive to determining that the signal light/traffic congestion condition is detected (e.g., "YES" at 704), the method 700 may continue to 706 to prioritize the message. If the signal light/traffic congestion condition is detected, the vehicle operating condition (e.g., the vehicle operating condition evaluated at 420 of FIG. 4) or a traffic signal/congestion factor of a vehicle operating condition may be determined to be satisfied. The method 700 may then present one or more messages (e.g. from an ordered list) based on priority, as indicated at 708.

It is to be understood that the methods illustrated in FIGS. 5-7 are exemplary and do not represent the only information that may be evaluated to determine whether the vehicle operating condition evaluated at 420 of FIG. 4 is satisfied. Further, a combination of factors including one or more of the evaluations performed in the methods illustrated in FIGS. 5-7 may be utilized to determine whether the vehicle operating condition of FIG. 4 is satisfied. For example, a speed factor of the vehicle operating condition may be met, while a traffic signal/congestion factor and deceleration factor may not be met if a vehicle is accelerating after being stopped at a traffic light/stop sign. In some embodiments, since all factors are not met and/or since a majority of the factors are not met, the vehicle operating condition may be determined to not be satisfied. For example, since the vehicle is accelerating from the stop in the above example, the vehicle may not be predicted to remain below a speed threshold for a long enough period to allow a complete message to be presented. Thus, the vehicle condition may be determined to not be satisfied and the message(s) may not be presented at that time.

Figure 8:
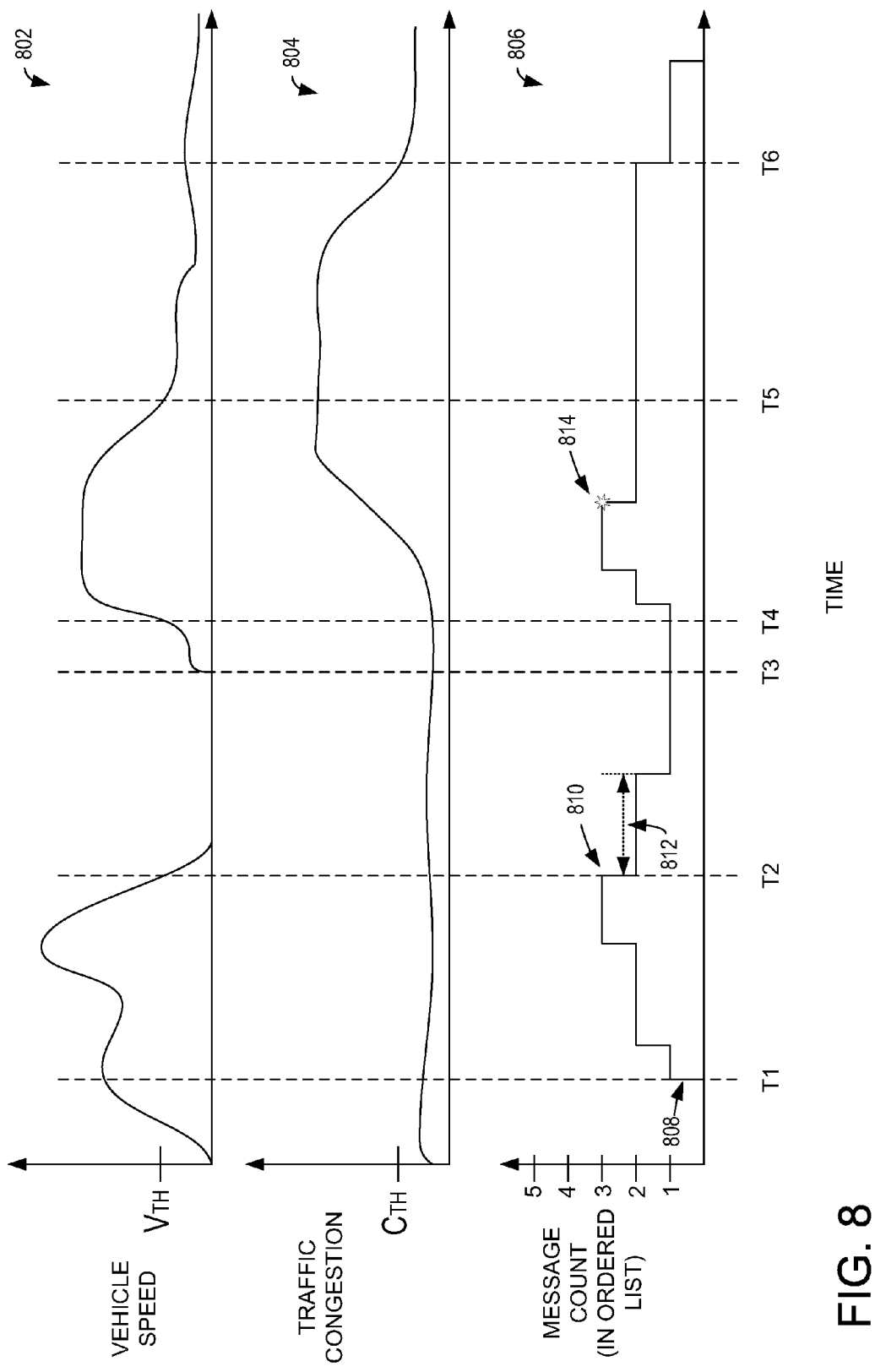
FIG. 8 shows example graphical plots of operating conditions and message counts over time in accordance with one or more embodiments of the present disclosure.

FIG. 8 shows an example plot 802 of vehicle speed, an example plot 804 traffic congestion, and an example plot 806 of a message count in an ordered list over time. Each plot is depicted on a synchronized timeline to illustrate the effect of the example vehicle operating conditions on a message count in an ordered list of received messages. In the plot 802 of vehicle speed, $V_{TH}$ represents a speed threshold below which a speed factor of the vehicle operating condition (e.g., the vehicle operating condition controlling whether messages are presented to a driver, as described in more detail at 420 of FIG. 4) is satisfied. In the plot 804 of traffic congestion, $C_{TH}$ represents a congestion threshold (e.g., a number/concentration of nearby cars, etc.) below which a congestion factor of the vehicle operating condition is satisfied.

Rising edges 808 in the plot 806 of the message count indicate that a message is received, prioritized, and inserted into an ordered list based upon the prioritization level. Accordingly, at time T1, a message is received, prioritized, and inserted into the ordered list. In the illustrated example, the ordered list is empty prior to the arrival of the message at time T1, thus adding the received message to the ordered list increases the message count to 1 at time T1. At the time that the message is received (e.g., at time T1), the vehicle speed is above the speed threshold, while the traffic congestion level is below a congestion threshold, as illustrated in plots 202 and 204, respectively. In the illustrated embodiment, a vehicle operating condition may not be satisfied if either the vehicle speed or the congestion level is above the respective threshold. Thus, the message count remains at 1 after receiving the message at time T1, as the message is not presented (or subsequently removed from the ordered list). As the vehicle speed remains above the speed threshold between times T1 and T2, each successive message that is received during that time frame (e.g., as indicated by rising edges on the plot 806), is prioritized and added to the ordered list, thereby increasing the number of messages included in the ordered list. For example, the message received at time T1 may be a first message. Upon receiving a second message (e.g., as indicated by the next rising edge of plot 806 after time T1), the second message is prioritized and placed in the ordered list in a location based on the prioritization. If the priority level/index of the second message is higher than the priority level/index of the first message, the second message is placed above the first message and, in this example, at the top of the ordered list, such that a next presentation of messages from the ordered list would present the second message before presenting the first message (if no other changes to the ordered list are made). Otherwise, if the priority level/index of the second message is lower than the priority level of the first message, the second message is placed below the first message and, in this example, at the bottom of the ordered list, such that a next presentation of messages from the ordered list would present the first message before presenting the second message (if no other changes to the ordered list are made).

Just prior to time T2, the ordered list includes three unread messages, arranged in order of priority. At time T2, the vehicle speed drops below the speed threshold, and the congestion level is still below the congestion threshold. For example, the vehicle may be slowing to come to a stop at a traffic light. Falling edges 810 may indicate that a message is removed from the ordered list, which may occur responsive to presenting the message to a driver of the vehicle. Thus, at time T2, the falling edge 810 indicates that the message in the ordered list with the highest priority is presented to the driver. In other words, responsive to the vehicle speed dropping below the speed threshold while the congestion level is also below the congestion threshold, a message may be automatically presented (e.g., without a request from a user or other system) at time T2. The time period represented by reference numeral 812, which occurs between two successive falling edges 810 of plot 806, may correspond to an amount of time that the message is presented to the driver. For example, if the message is presented audibly, the message may be audibly presented to the driver over the course of the time period indicated by reference numeral 812. As the vehicle speed remains below the speed threshold and the congestion level remains below the congestion level threshold after the highest priority message in the ordered list is presented at time T2, another message (e.g., the next highest priority message in the ordered list) may be presented, as indicated by the subsequent falling edge on the plot 806.

At time T3, the vehicle speed may begin increasing from a stop. For example, the traffic light may change at or near time T3, enabling the vehicle to continue traveling. Although the vehicle speed is still below the threshold speed and the congestion level is still below the congestion threshold at time T3, the remaining message in the ordered list may not be presented due to a determination that the presentation of the message may not be completed prior to the vehicle reaching a speed that is above a speed threshold. For example, a light change may be detected at or before time T3 by a camera of the vehicle and/or responsive to a communication received from an infrastructure element, indicating that the vehicle is likely to change to a state that does not satisfy the vehicle operating condition. Accordingly, at time T3, the remaining message in the ordered list is not presented. As predicted, the vehicle speed rises above the speed threshold at time T4. Between times T4 and T5, additional messages may be received, prioritized, and added to the ordered list, thereby increasing the number of messages in the ordered list.

As indicated at 814, an event may occur that causes a message from the ordered list to be presented to the driver, despite the fact that the vehicle speed and the congestion level are above the respective thresholds. For example, the event represented by 814 may correspond to user input (e.g., voice input, gesture input, touch input, etc.) specifically requesting a message (e.g., a particular message, the highest priority message in the ordered list, the most recently received message, etc.) to be presented. Accordingly, the user input may override the determination of whether the vehicle operating condition is satisfied, resulting in a presentation of a message, despite not satisfying the vehicle operating condition. In other words, the user input may override the selective presentation of received messages by causing a presentation of received messages responsive to the user input requesting the presentation of the received messages regardless of the operating condition of the vehicle.

At time T5, the vehicle speed is below the speed threshold, however the congestion level is above the congestion threshold. Accordingly, no messages from the ordered list are presented at time T5. However, at time T6, the congestion level drops below the congestion threshold, and the vehicle speed is still below the speed threshold. In response, a message from the ordered list (e.g., the highest priority message in the ordered list) is presented at time T6, as represented by the falling edge on the plot 806. After the message is presented at time T6, the vehicle speed and congestion levels remain below the respective thresholds, and the last remaining message in the ordered list is presented.

Figure 9:
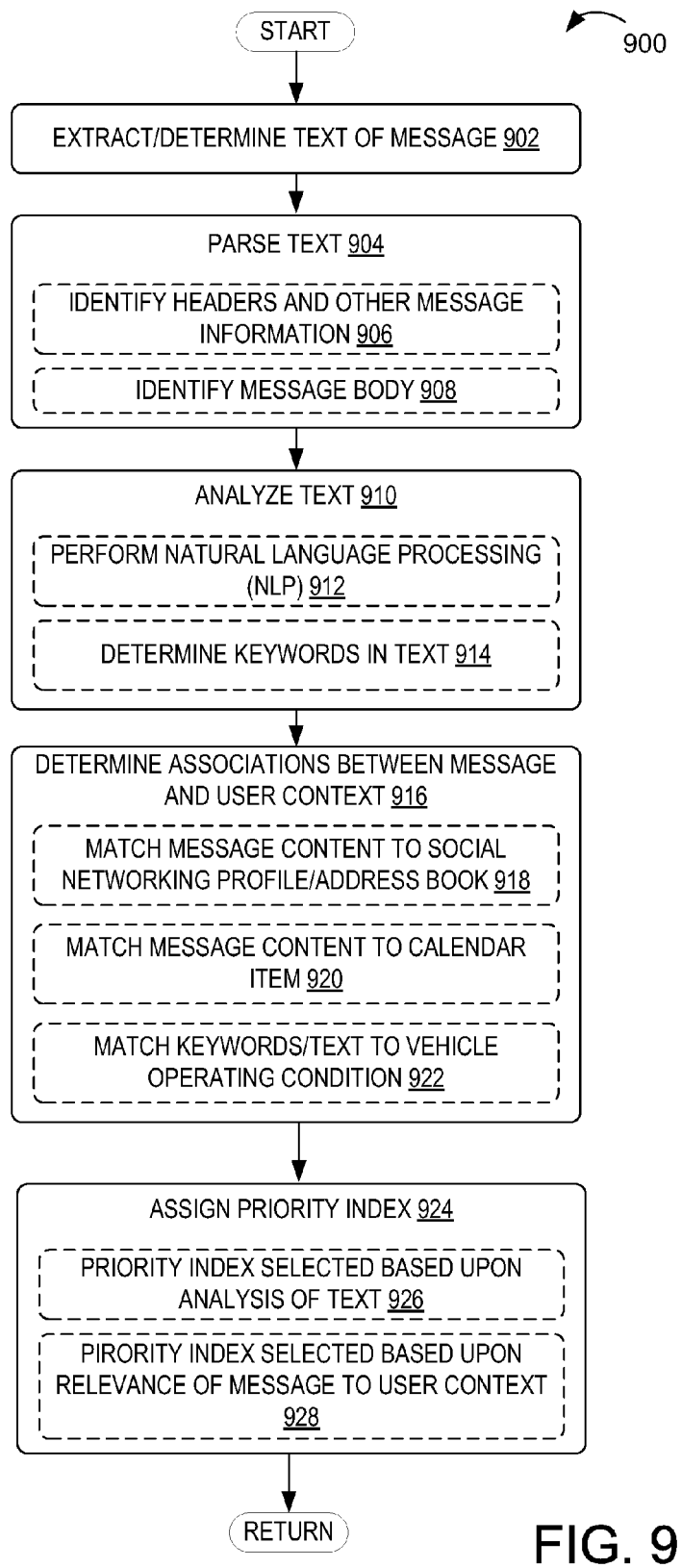
FIG. 9 shows a flow chart of a method for prioritizing received messages in accordance with one or more embodiments of the present disclosure.

FIG. 9 is a flow chart of an example method 900 for prioritizing received messages. For example, method 900 and/or one or more portions of method 900 may be performed as a subroutine of method 400 (e.g., a subroutine of prioritizing the message at 408 of FIG. 4) and performed by an in-vehicle computing system, such as in-vehicle computing system 109, and/or a selective message presentation system, such as selective message presentation system 200 of FIG. 2. Method 900 includes extracting and/or determining text of a message, as indicated at 902. At 904, the method 900 includes parsing the extracted and/or determined text. For example, parsing the text may include identifying headers and other message information (e.g., senders, receivers, sent/receipt time, message routing information, etc.), as indicated at 906, and/or identifying the message body (e.g., the information provided directly by the sender of the message), as indicated at 908.

At 910, the method 900 includes analyzing the text. For example, a message analysis module, such as message analysis module 208 of FIG. 2, may process the extracted and parsed text to determine information about the content of the message. As indicated at 912, analyzing the text may include performing natural language processing (NLP). The method 900 may include determining keywords in the text, as indicated at 914.\

At 916, the method 900 includes determining associations between the message content and the user context. For example, the message content may include the keywords, the headers and other message information, and/or any other suitable message data. The method 900 may include matching message content to social networking profiles and/or an address book (e.g., of the driver), as indicated at 918. Additionally or alternatively, the method 900 may include matching the message content to one or more calendar items associated with the driver or other user of the in-vehicle computing system, as indicated at 920. For example, the message may be analyzed to determine whether a data, time, place, and/or participant of an upcoming calendar event is referenced in/by the message. At 922, the method 900 may include matching keywords and/or text of the message to vehicle operating conditions. For example, if the vehicle is in or near a location referenced in or by the message, the message may be matched to a vehicle operating condition at 922.

At 924, the method 900 includes assigning a priority index. The priority index may be determined in any suitable manner based upon analysis of the text, as indicated at 926 and/or based upon relevance of the message to the user context, as indicated at 928. For example, the presence, type, and/or number of associations determined at 916 may be utilized to derive and/or assign the priority index to the message. In this way, an importance of the message may be ascertained and utilized to control the order of presentation of messages when conditions allow such presentation to occur (e.g., when the vehicle condition is satisfied and/or user input is received).

By aggregating information from multiple sources and selectively presenting messages to a user based on the aggregated information as described above, a potentially distracting actions of listening/viewing and/or responding to received messages may be relegated to times at which the risk associated with such distractions is low (e.g., while the vehicle is stopped or moving steadily at a slow speed). In this way, a user may still remain informed about messages that are received while driving, while maintaining safe operation of the vehicle.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or selective message presentation system 200 described with reference to FIGS. 1 and 2. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method of selectively presenting received messages in a vehicle via an in-vehicle computing system, the method comprising:
   extracting information of a received message;
   determining an operating condition of the vehicle;
   assigning a priority to the received message based on one or more of the extracted information and the operating condition of the vehicle, the priority being selectively updated based on a change in the operating condition of the vehicle;
   insert the received message into an ordered list of received messages based on the priority of the received message, the ordered list being re-ordered responsive to receiving a new message and responsive to detecting a change in the operating condition of the vehicle; and
   selectively presenting the information of the received message from the ordered list in order of priority based on a selected operating condition of the vehicle being satisfied, the received messages from the ordered list being continuously presented in order of priority until the selected operating condition of the vehicle is no longer satisfied.

2. The method of claim 1, wherein the extracting includes extracting text, the method further comprising inserting the received message in an ordered list of received messages based upon the prioritization, and wherein selectively presenting the received message includes presenting a first received message in the ordered list of received messages, the first received message having a highest priority assignment, the ordered list of received messages being continuously re-ordered as the operating condition of the vehicle changes.

3. The method of claim 2, further comprising processing the extracted text of the received message to determine whether the extracted text includes keywords corresponding to a calendar item of a user of the in-vehicle computing system, wherein received messages that include keywords corresponding to a calendar item are prioritized higher than received messages that do not include keywords corresponding to a calendar item.

4. The method of claim 2, further comprising determining one or more of a sender and other receivers of the received messages and prioritizing the message based upon the determined sender and other receivers, the ordered list of received messages being continuously re-ordered as new messages are received.

5. The method of claim 2, further comprising processing the extracted text of the received message to determine whether the extracted text includes keywords corresponding to routing information of the vehicle or vehicle-specific keywords, wherein received messages that include keywords corresponding to the routing information or vehicle-specific keywords are prioritized higher than received messages that do not include keywords corresponding to the routing information or vehicle-specific keywords.

6. The method of claim 1, wherein the operating condition of the vehicle includes a vehicle speed, and wherein selectively presenting the received message includes automatically presenting the received message responsive to determining that the vehicle speed is below a speed threshold and not presenting the received message when one or more vehicle operating conditions are not satisfied, the one or more vehicle operating conditions including the vehicle speed being above the speed threshold.

7. The method of claim 6, wherein the speed threshold is dynamically determined based on one or more of a measured vehicle speed and a predicted vehicle speed, the speed threshold being set to the measured and/or predicted vehicle speed responsive to the measured and/or predicted vehicle speed changing by less than a threshold for a period of time.

8. The method of claim 7, further comprising determining the predicted vehicle speed based upon one or more of traffic signal information, real-time traffic status, historical data, and information from one or more other vehicles.

9. The method of claim 1, further comprising overriding the selective presentation of the received message by presenting the received message responsive to user input requesting a presentation of the received message regardless of the operating condition of the vehicle, and wherein selectively presenting the information of the received message comprises presenting the information of the received message via an output device selected based on one or more of a type of received message and the operating condition of the vehicle.

10. The method of claim 2, wherein the extracting includes extracting text, and wherein the operating condition of the vehicle includes routing information from a navigation system of the in-vehicle computing system indicating one or more of a location of the vehicle, a destination of the vehicle, and a route of the vehicle, the method further comprising interpreting semantics of the message based on the operating condition of the vehicle and prioritizing the received message based on the interpreted semantics of the message.

11. The method of claim 10, further comprising processing the extracted text of the received message to determine whether the extracted text includes keywords corresponding to the routing information and wherein selectively presenting the received message includes presenting the received message if the extracted text includes one or more keywords corresponding to the routing information and not presenting the received message if the extracted text does not include one or more keywords corresponding to the routing information.

12. The method of claim 1, wherein the extracting includes extracting text, and wherein selectively presenting the received message includes performing a text to speech conversion to the extracted text of the received message to form speech data representing the received message and audibly presenting the speech data via one or more speakers in the vehicle.

13. An in-vehicle computing system of a vehicle, the in-vehicle computing system comprising:
a display;
a processor;
a storage device that stores instructions executable by the processor to:
extract text of received messages;
identify senders and/or receivers of the received messages;
prioritize the received messages based on the extracted text and the identified senders and/or receivers to assign a priority to each received message;
insert the received messages into an ordered list based on the priority of each received message, the ordered list being re-ordered responsive to receiving a new message and responsive to detecting a change in an operating condition of the vehicle; and
selectively present the received messages from the ordered list in order of priority based on a selected operating condition of the vehicle being satisfied, the received messages from the ordered list being continuously presented in order of priority until the selected operating condition of the vehicle is no longer satisfied.

14. The in-vehicle computing system of claim 13, wherein the instructions are further executable to determine whether the extracted text includes keywords related to a social networking profile of a user of the in-vehicle computing system and prioritize received messages that include keywords corresponding to the social networking profile as higher than received messages that do not include keywords corresponding to the social networking profile.

15. The in-vehicle computing system of claim 13, wherein the instructions are further executable to prioritize the received messages based on an operating condition of the vehicle.

16. The in-vehicle computing system of claim 13, further comprising an inter-vehicle system communication module communicatively connected to one or more speakers of the vehicle, the instructions further executable to present the received message audibly via the one or more speakers of the vehicle.

17. The in-vehicle computing system of claim 13, wherein selectively presenting the received messages includes selectively presenting the received messages visually via the display of the in-vehicle computing system.

18. An in-vehicle computing system of a vehicle, the in-vehicle computing system comprising:
a display;
a processor; and
a storage device that stores instructions executable by the processor to:
extract text of a received message;
prioritize the received message based on the extracted text to assign a priority to the received message;

insert the received message in an ordered list of received messages, a position of the received message in the ordered list being selected based upon the priority of the received message;

reorder the ordered list responsive to receiving a new message and responsive to detecting a change in an operating condition of the vehicle; and selectively present a first received message of the ordered list based on the priority of the first received message and based on a selected operating condition of the vehicle being satisfied, the received messages from the ordered list being continuously presented in order of priority until the selected operating condition of the vehicle is no longer satisfied.

19. The in-vehicle computing system of claim 18, wherein the instructions are further executable to determine the operating condition of the vehicle based upon information received from a controller area network (CAN) bus of the vehicle.

20. The in-vehicle computing system of claim 18, further comprising an external device interface communicatively connected to one or more of another in-vehicle computing system of another vehicle, an infrastructure associated with one or more routes of the vehicle, and a camera service, the instructions further executable to determine the operating condition of the vehicle based upon information received from the other vehicle, the infrastructure, and/or the camera service via the external device interface.

* * * * *